Patented Dec. 16, 1930

1,785,451

UNITED STATES PATENT OFFICE

JOSEPH H. LAMBERT, OF CHICAGO, ILLINOIS, ASSIGNOR TO STANDARD OIL COMPANY, OF WHITING, INDIANA, A CORPORATION OF INDIANA

INSECTICIDE

No Drawing. Application filed December 6, 1924. Serial No. 754,437.

The present invention relates to improvements in insecticides and fungicides more particularly those suitable for use as antiparasitic sprays for the treatment of fruit trees, plants, and the like.

In accordance with the present invention, a light petroleum oil, such as straw oil, kerosene or the like is admixed with a suitable proportion of a sulfonic compound derived from the treatment of hydrocarbon oils, particularly lubricant oils, with concentrated or fuming sulfonic acid. The proportion of the sulfonic compound, which may be a sulfonic acid or a neutral soluble salt thereof, such as the sodium salt may be from one eighth to one third of the proportion from oil employed. To the mixture a small amount of a soap, such as a rosin or fatty acid soap may be added, if desired, the proportion of soap employed being suitably from one-tenth to one-half the proportion of sulfonic compounds used. Small proportions of other constituents, such as water, denatured alcohol, preservatives or other materials may be added to the mixture. The following has been found to be a suitable composition:

| | Parts |
|---|---|
| Straw oil | 71 |
| Oil soluble sodium salts of mineral oil sulfonic compounds | 20 |
| Soap | 5 |
| Denatured alcohol | 1 |
| Water | 3 |

In the formula above given, the use of oil soluble sulfonic compounds has been specifically set forth. The water soluble compounds derived from the treatment of hydrocarbon oils with strong sulfuric acid may likewise be employed in a similar manner, such compounds being produced, for example, in the manner described in the Humphreys et al., Patent No. 1,474,933, granted November 20, 1923. I may also use the oil soluble naphthenic acids and soaps derived from the treatment of certain coastal naphthenic oils, for example, that known as Belleview crude, with dilute solutions of alcohol.

In use, the composition produced as above set forth is admixed with water, from 5 to 20 parts of water being used for each part of the composition. Complete emulsification is effected, and a stable emulsion is produced with which infected trees, plants and the like are sprayed. The resulting spray has been found to be exceedingly efficient in the control and eradication of numerous diseases, for example, the San Jose scale on fruit trees.

I claim:

1. A concentrated tree spray composition adapted to be mixed with large volumes of water and emulsified therein for application to fruit trees and the like, which composition comprises straw oil mixed with a small amount of an oil soluble sulfonic compound derived from the treatment of heavy hydrocarbon oils with concentrated sulfuric acid, small amounts of a water soluble emulsifying soap, and small amounts of an alcohol.

2. A composition of matter for emulsification in water to form a tree spray comprising a straw oil, an oil soluble mineral oil sulfonic compound in amounts of one eighth to one third the volume of oil, about 5% of a water soluble soap and about 1% of alcohol.

JOSEPH H. LAMBERT.